Sept. 14, 1926.                    A. H. ELLIS                    1,599,812
                                  GLARESHIELD
                               Filed July 23, 1925
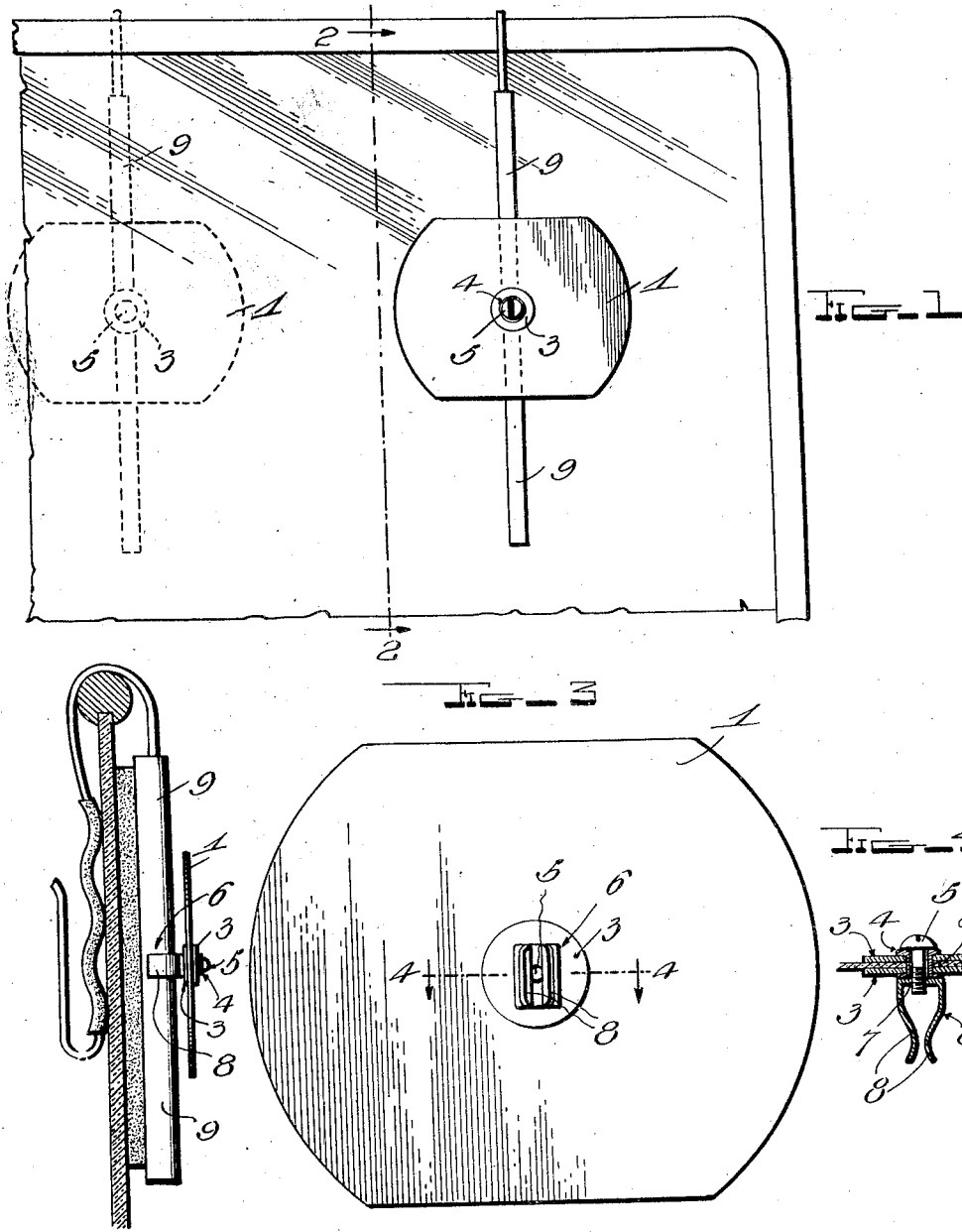
Inventor
Arthur H. Ellis,
By H. B. Willson & Co
Attorneys
Witness Patented Sept. 14, 1926.

1,599,812

UNITED STATES PATENT OFFICE.

ARTHUR H. ELLIS, OF ROCHESTER, MINNESOTA.

GLARESHIELD.

Application filed July 23, 1925. Serial No. 45,682.

My invention relates to improvements in glare shields designed for protecting automobile driver's eyes against approaching headlights and strong sun rays, and it is the object of the invention to provide a device of this character which is exceptionally simple and inexpensive, and may be readily mounted upon a portion of an ordinary windshield wiper to be moved into and out of effective position, by movement of said wiper.

With the foregoing in view, the invention resides in the novel subject matter hereinafter described and claimed, the description being supplemented by the accompanying drawing.

Figure 1 is a front elevation of the invention operatively associated with a windshield and wiper, showing the device in effective position in full lines and in another position in dotted lines.

Figure 2 is a vertical sectional view as indicated by line 2—2 of Fig. 1.

Figure 3 is an enlarged rear elevation of the shield and its attaching means.

Figure 4 is a horizontal sectional view on line 4—4 of Fig. 3.

In the drawing above briefly described, the numeral 1 designates a sheet of flexible, light-diffusing material, colored celluloid being preferably used. This sheet is formed with a central opening 2, and a pair of sheet-stiffening washers 3, preferably formed of aluminum, contact with opposite sides of said sheet and have their central openings in alinement with the opening 2. A tubular rivet 4 passes through the three alined openings and is upset at its ends in the usual manner. By this rivet, the sheet 1 and the washers 3 are permanently secured together and a metal-walled opening is provided to receive a screw or other fastener 5 for securing the shield to an attaching clip 6. This clip is formed of any desired spring metal, and its arm-connecting portion is formed with an opening 7 alined with the rivet 4 and receiving the fastener 5. The arms 8 of the clip 6 extend laterally at substantially right angles to the shield 1 and said arms are adapted to tenaciously grip a portion 9 of a windshield wiper, so as to effectively, yet detachably mount the shield, in a manner which permits it to be readily moved to an active or an out-of-the-way position, as occasion may demand, simply by adjusting the windshield wiper.

It will be seen from the foregoing that the invention is exceptionally simple and inexpensive, yet that it will be efficient and very desirable. Thin celluloid may be used for constructing the shield 1, yet this thin sheet is held to a large extent against distortion or warping by the metal washers 3 clamped tightly against opposite sides of the sheet by the rivet 4. Moreover, this rivet provides a metal-walled opening through which the screw or the like 5 passes and thus insures a permanent non-breakable connection between the shield and the attaching clip 6.

I am aware that it is old in the art to use a suction cup for attaching a glare-shield to a windshield and I also know that there is nothing novel in the mere idea of mounting a glare-shield upon a windshield wiper to be adjusted by the latter. Shields held in place by suction cups, however, must ordinarily be left in the position to which they are adjusted for night driving, or else considerable difficulty is experienced in moving them and replacing them at the desired point, when their use becomes necessary. Glare-shields heretofore mounted on windshield wipers have involved a rather costly and complicated structure, and for reasons such as these, the types of glare-shields to which I have referred, have not had very extensive use. My invention, however, is free of previous objections and is exceptionally simple and inexpensive.

I claim:

A glare shield comprising a flexible sheet of light-diffusing material having a substantially central opening, a pair of stiffening washers contacting with opposite sides of said sheet with their openings in alinement with said central opening of the sheet, a tubular rivet passing through the three alined openings, a U-shaped spring clip having an opening in its arm-connecting portion alined with said tubular rivet, and a fastener passing through said tubular rivet and the opening of said clip, the arms of said clip projecting from the sheet at substantially right angles to the latter and being adapted to tenaciously grip a vertical portion of a windshield wiper.

In testimony whereof I have hereunto affixed my signature.

ARTHUR H. ELLIS.